Nov. 20, 1951    R. O. BULLARD    2,575,906
ADJUSTABLE MAGNETIC PRESSURE VALVE
Filed Dec. 27, 1948

Inventor:
Robert O. Bullard,
by
His Attorney.

Patented Nov. 20, 1951

2,575,906

UNITED STATES PATENT OFFICE 2,575,906

ADJUSTABLE MAGNETIC PRESSURE VALVE

Robert O. Bullard, Schenectady, N. Y., assignor to General Electric Company, a corporation of New York Application December 27, 1948, Serial No. 67,328

7 Claims. (Cl. 137—139)

1

The present invention relates to adjustable magnetic pressure valves, and is concerned particularly with valves for pressure cookers and the like. It has for its principal object the provision of an improved magnetic valve of simple construction which includes means for adjusting the valve to operate at a predetermined pressure in a reliable and efficient manner.

Figure 1:
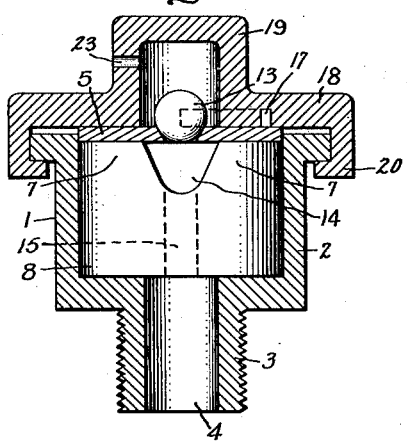
Figure 2:
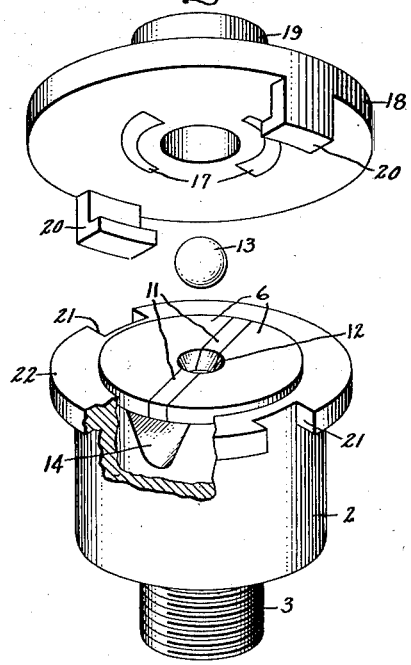
Figure 3:
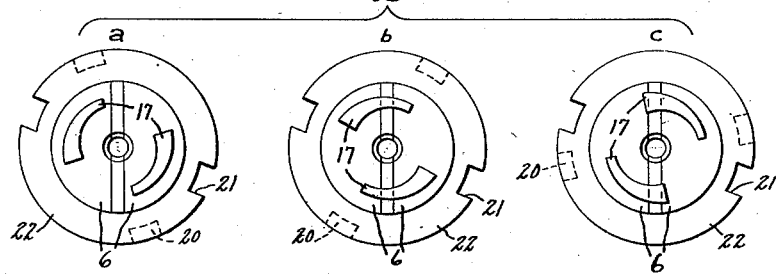
Figure 4:
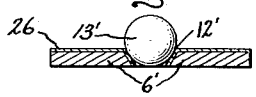

For a more complete understanding of the invention reference is made to the accompanying drawing in which Fig. 1 is a vertical sectional view of a valve structure embodying the principles of the present invention; Fig. 2 is an expanded perspective view of the elements of the valve structure; Fig. 3 is a view illustrating somewhat diagrammatically the relative positions of certain elements of the valve under different operating conditions, and Fig. 4 illustrates one means for obtaining increased accuracy in the operation of the valve.

Briefly described the adjustable valve of the present invention comprises an apertured valve seat including a pair of opposed magnetic pole pieces which are spaced by a strip of non-magnetic material with the pole pieces forming opposite side walls of the aperture. There is also provided a magnetic closure member adapted to close the aperture and to be attracted to the closing position by the magnetic flux of the pole pieces. To adjust the valve for operation at different pressures there is provided in accordance with the present invention a shunting arrangement by means of which the magnetic pull on the closure member can be varied. The shunt arrangement broadly comprises a piece of material of high magnetic permeability in sliding contact with the upper surface of the valve seat, movement of the shunt material across the surface of the valve seat into bridging relationship to the pole pieces causing a short circuiting of the pole pieces thereby decreasing the force with which the valve closing member is held in the valve closing position.

In the specific modification of the invention illustrated in the drawing and with particular reference to Figs. 1 and 2, numeral 1 indicates a valve body of non-magnetic material such as brass having an upper cylindrical section 2 and a lower reduced threaded section 3 by means of which the valve can be suitably connected to a pressure chamber, as for example to the lid of a pressure cooker. The valve body further contains a vertically arranged passageway 4 which at its lower end communicates with the interior of the pressure vessel.

2

The valve mechanism proper is arranged within the upper section 2 of the valve body and comprises a valve seat 5 including two pole pieces 6 respectively secured to or in contact with the opposite poles 7 of a permanent magnet 8. The permanent magnet, which is preferably composed of a material such as Alnico having a high coercive force, is of a cylindrical shape with the vertical sides thereof in pressure tight contact with the inner walls of the upper section 2 of the valve body.

The valve seat 5 is in the form of a disc including the two pole pieces 6 joined by sections 11 of a non-magnetic material such as brass. A tapered aperture 12 located between the pole pieces is adapted to receive a valve closure member in the form of a ball 13 of a high permeability magnetic material and this aperture along with the sections 11 of non-magnetic material form a gap in the magnetic circuit including the permanent magnet 8 and pole pieces 6. The fluid or pressure communication between the valve aperture 12 and the passageway 4 is obtained through notch 14 between poles 7 of the permanent magnet, and a vertical passageway 15 extending longitudinally of the body through the bottom part of magnet 8 and connecting the notch with passageway 4.

The ball 13 of a diameter somewhat larger than the diameter of the aperture 12 is attracted into the aperture, that is, into the working gap of the magnetic circuit and is held in a valve closing position therein against the fluid pressure beneath the valve aperture by a force dependent primarily on the flux density of the magnetic circuit passing through the ball 13. Thus in the arrangement so far described the ball 13 will remain seated until such time as the pressure on the inlet side of the valve exceeds the force of the magnetic attraction on the ball at which time the ball will be pushed upwardly to a valve opening position until the excess pressure is relieved.

A non-magnetic valve cap 18 of brass or other suitable non-magnetic material includes a dome shaped portion 19 overlying the aperture 12 and adapted to receive ball 13 and a pair of depending lips 20 adapted to be received by opposed notches 21 in the annular flange 22 provided at the upper edge of the valve body 2. On rotation of the cap, the lips 20 engage the flange 22 and serve to hold the cap in operating position on the valve body. An outlet 23 is provided in section 19 of the cap to vent any air, steam or other fluid passing through aperture 12.

For many applications of pressure relief valves, as for example on pressure cookers for home use, it is desirable that the relief valve be adjustable to operate at any one of a plurality of pressures. The pressure adjusting feature of the present invention comprises one or more shunting members in flux carrying relationship with the upper surface of the valve seat, the shunting member or members being constructed and arranged for movement into and out of bridging relationship with pole pieces 6 thereby to vary the amount of the flux passing through the closure member 13.

In the illustrated modification of the invention the pressure adjusting means comprises two curved tapered steel shunts 17 as inserts in the bottom surface of the valve cap 18.

The manner in which the valve is adjusted for pressure relief at any one of a number of predetermined pressures is best understood by reference to Fig. 3 in which the three views a, b and c illustrate the relative positions of the shunts 17 with reference to the magnet working gap for three different relief pressures. When the cap 18 is rotated on the valve body to a point where the shunts 17 entirely overlie the pole pieces 6 and do not bridge the working gap, the flux density through the ball 13 is at the maximum. As the cap is rotated in a clockwise direction the shunts move from the position shown in Fig. 3a to a point where the narrowest section of the arcuate tapered shunts bridge the working gap as shown in Fig. 3b so that the flux density passing through ball 13 is decreased by an amount dependent upon the ratio between the permeability of the portion of the shunts bridging the working gap and the permeability of ball 13. With the shunts in this position, the valve opens at a pressure somewhat lower than when the shunts are in the position shown in Fig. 3a.

As the cap is further rotated in a clockwise direction to a position such as that illustrated in Fig. 3c, portions of the tapered shunts of increased cross sectional area are brought into bridging relationship with magnetic pole pieces 6 to further decrease the relative attraction of the pole pieces for the ball 13 and thus to cause the valve to operate at a fluid pressure which is lower than for either positions a or b.

It is to be understood, of course, that suitable indicia may be placed on the external portions of the cap and valve body for indicating either the relative operating pressures of the valve for different cap positions or for indicating the exact pressure or pressures at which the valve will operate for each of a plurality of cap positions.

To assure a minimum differential between the pressure required to open the valve and the pressure at which the valve will close, it is frequently desirable to introduce a permanent air gap in the magnetic circuit. This may be done by providing the valve seat with a non-magnetic shim or a coating of non-magnetic material which will support the closure member in spaced relationship with the pole pieces. The use of a non-magnetic coating for this purpose is illustrated in Fig. 4 in which the disc, which includes the two pole pieces 6' and aperture 12' is provided on its upper surface and on the walls defining the aperture 12' with a thin coating 26 of any suitable non-magnetic material such as nickel. As ball closure member 13' then rests on the coating 26, which may be of a thickness of about 0.05 inch, the coating constitutes an effective and constant air gap which decreases the differential between the magnetic pull on the closure member 13' in the seated position and the pull thereon in the raised position.

Such an arrangement or merely the provision of a non-magnetic liner or shim of brass or the like within the valve aperture also minimizes the effect of any condensate which may collect on the closure member or the walls of the aperture during use of the valve.

While the invention has been described with reference to a particular arrangement of shunts of specific configuration, it is to be understood that it is not limited thereto. For example, one shunt may be sufficient in which case only one side of the working gap will be bridged. Furthermore, the shunts need not be of the configuration or shape shown in the drawing. For example, either or both of the shunts may comprise a series of individual segments of gradually increasing cross sectional area so arranged that they may individually be brought into bridging relationship to the pole pieces 6 thereby to vary the relative flux density impedance of the magnetic circuit through the ball 13.

What I claim as new and desire to secure by Letters Patent in the United States is:

1. A magnetic ball valve comprising a valve casing having therein a vertically arranged passage terminating in an apertured valve seat including magnetic pole pieces of opposite polarity on opposite sides of the aperture, a ball of magnetic material adapted to rest in and close said aperture, and means for short circuiting said pole pieces, said means including a magnetic shunt in sliding engagement with the upper surface of said seat for movement into and out of bridging relationship with said pole pieces.

2. An adjustable valve comprising an apertured valve seat including a pair of magnetic pole pieces of opposite polarity spaced by a strip of non-magnetic material, said pole pieces forming opposite side walls of said aperture, a magnetic closure member adapted to close said aperture and to be attracted to the aperture closing position by said pole pieces and an adjustable shunting arrangement for adjusting the magnetic pull on said closure member including a piece of magnetic material contacting the upper surface of said pole pieces and adapted to be moved across said surface into and out of bridging relationship with said pole pieces.

3. An adjustable valve comprising a magnetized apertured valve seat in which the portions of said seat on opposite sides of the aperture are of opposite polarity, a magnetic closure member adapted to be held in closing relationship to said aperture by the magnetized valve seat, and a shunt so constructed and arranged as to be movable over the surface of said seat to vary the magnetic pull on said closure member.

4. An adjustable pressure valve comprising a valve casing having a vertically arranged passage terminating in a horizontally arranged apertured valve seat, said seat being in the form of a flat disc comprising two pole pieces of opposite polarity on opposite sides of said aperture joined by sections of non-magnetic material, a ball of magnetic material adapted to rest in said aperture and to be magnetically held therein by said pole pieces, and means for adjusting the magnetic pull exerted on said ball comprising a body of non-magnetic material having a flat bottom portion in sliding contact with the upper surface of said seat and a tapered magnetic insert so constructed and arranged in the bottom of said body as to contact the upper surface of said valve seat whereby rotation of said body about its vertical axis will cause said insert to bridge said pole pieces and vary the magnetic pull on said ball.

5. An adjustable magnetic ball valve comprising a disc-shaped apertured valve seat including a pair of magnetic pole pieces of opposite polarity on opposite sides of the aperture and joined by means of strips of non-magnetic material, a magnetic ball adapted to be held in closing relationship to said aperture by said pole pieces, a non-magnetic valve cap having a flat bottom portion in sliding contact with the surface of said valve seat, a pair of opposed arcuate tapered magnetic shunts in the bottom surface of said cap, said shunts being so constructed and arranged that rotation of said cap about a vertical axis extending through said aperture will vary the short circuiting effect of said shunts thereby to adjust the magnetic pull on said ball.

6. An adjustable magnetic pressure valve comprising a valve body having a vertical passageway terminating in an apertured valve seat having a flat surface, said valve seat comprising a pair of pole pieces of opposite polarity on opposite sides of the aperture joined by relatively narrow sections of non-magnetic material of a width less than the diameter of said aperture, a magnetic closure member adapted to be held in closing relationship to said aperture by said pole pieces, a non-magnetic valve cap rotatably mounted on said body and including a pair of opposed tapered magnetic shunts integral therewith and in sliding contact with the surface of said valve seat, rotation of said cap to various angular positions with regards to said seat causing said shunts to be brought into bridging relationship with said poles to vary the reluctance of the magnetic circuit including said pole pieces and said closure member, and thereby to control the effective pressure within said passageway necessary to unseat said closure member.

7. An adjustable magnetic pressure valve comprising a valve body having a vertical passageway terminating in an apertured valve seat having a flat surface, said valve seat comprising a pair of pole pieces of opposite polarity on opposite sides of the aperture joined by relatively narrow sections of non-magnetic material of a width less than the diameter of said aperture, said sections and said aperture forming a working gap, a magnetic closure member adapted to be held in closing relationship to said aperture by said pole pieces, a non-magnetic valve cap rotatably mounted on said body and including a pair of opposed tapered magnetic shunts integral therewith and in sliding contact with the surface of said valve seat whereby rotation of said cap to various angular positions with regards to said seat causes said shunts to bridge the portions of said gap formed by said sections of non-magnetic material and to vary the reluctance of the magnetic circuit including said pole pieces and said closure member, thereby to control the effective pressure within said passageway necessary to unseat said closure member.

ROBERT O. BULLARD.

REFERENCES CITED

The following references are of record in the file of this patent:

UNITED STATES PATENTS

| Number | Name | Date |
| --- | --- | --- |
| 152,444 | Westland | June 23, 1874 |

FOREIGN PATENTS

| Number | Country | Date |
| --- | --- | --- |
| 212,570 | Holland | Aug. 5, 1909 |